US012785299B2

(12) United States Patent
Kropiewnicki

(10) Patent No.: US 12,785,299 B2
(45) Date of Patent: Nov. 3, 2026

(54) CONTACT SPRING ASSEMBLY FOR THE SELF-LOCKING CONTACTING OF AN ELECTRICAL CONDUCTOR

(71) Applicant: HARTING ELECTRIC STIFTUNG & CO. KG, Espelkamp (DE)

(72) Inventor: Norbert Kropiewnicki, Bielefeld (DE)

(73) Assignee: HARTING ELECTRIC STIFTUNG & CO. KG, Espelkamp (DE)

( * ) Notice: Subject to any disclaimer, the term of this patent is extended or adjusted under 35 U.S.C. 154(b) by 321 days.

(21) Appl. No.: 18/719,777

(22) PCT Filed: Dec. 5, 2022

(86) PCT No.: PCT/DE2022/100908

§ 371 (c)(1), (2) Date: Jun. 13, 2024

(87) PCT Pub. No.: WO2023/110014

PCT Pub. Date: Jun. 22, 2023

(65) Prior Publication Data

US 2025/0141125 A1 May 1, 2025

(30) Foreign Application Priority Data

Dec. 14, 2021 (DE) ..................... 10 2021 132 926.4

(51) Int. Cl.
*H01R 4/48* (2006.01)

(52) U.S. Cl.
CPC ......... *H01R 4/4821* (2023.08); *H01R 4/4833* (2023.08)

(58) Field of Classification Search
CPC ............................ H01R 4/4821; H01R 4/4833
See application file for complete search history.

(56) References Cited

U.S. PATENT DOCUMENTS 10,648,770 B2 5/2020 Vergara et al.
2003/0194918 A1 10/2003 Fricke et al.
(Continued)

FOREIGN PATENT DOCUMENTS

CN 202564566 U 11/2012
DE 20205821 U1 9/2003
(Continued)

OTHER PUBLICATIONS

International Preliminary Report on Patentability, dated Jun. 13, 2024, for International Patent Application No. PCT/DE2022/100908. (14 pages).

(Continued)

*Primary Examiner* — Travis S Chambers
(74) *Attorney, Agent, or Firm* — Seed Intellectual Property Law Group LLP

(57) ABSTRACT

A contact spring assembly for self-locking a wire of an electrical conductor; —a contact spring which has a base leg held stationary with respect to a support wall and has a clamping leg connected to the base leg by a curve portion and forms an insertion receptacle for the wire and the clamping leg having at its free end a gripping edge for the wire; and —a release element guided for translation and having an actuation arm, the free end of which, in a release position, acts on a stop and holds the clamping leg in a position where the clamping leg is bent back against the base leg; wherein the clamping leg has a bend point curved in the direction opposite the direction of curvature of the curve portion and is followed, toward the stop, by an additional bend point curved in the same direction.

10 Claims, 6 Drawing Sheets

(56) References Cited

U.S. PATENT DOCUMENTS

| | | | |
|---|---|---|---|
| 2004/0102078 A1 | 5/2004 | Miyoshi et al. | |
| 2017/0070004 A1 | 3/2017 | Bausch et al. | |
| 2024/0154353 A1 | 5/2024 | Kropiewnicki | |

FOREIGN PATENT DOCUMENTS

| | | | | |
|---|---|---|---|---|
| DE | 202012103314 U1 | 1/2014 | | |
| DE | 102015106073 A1 | 10/2016 | | |
| DE | 202016104707 U1 | 10/2016 | | |
| DE | 102015114938 A1 | 3/2017 | | |
| DE | 202019104333 U1 | 10/2019 | | |
| DE | 102021108600 B3 | 7/2022 | | |
| DE | 102024137220 A1 * | 6/2026 | ........... | H01R 4/4835 |
| EP | 1309036 A1 | 5/2003 | | |
| EP | 1353407 A1 | 10/2003 | | |
| EP | 1357640 A2 | 10/2003 | | |
| EP | 3139445 A1 | 3/2017 | | |
| EP | 3 324 489 A1 | 11/2017 | | |

OTHER PUBLICATIONS

International Search Report and Written Opinion, mailed Mar. 7, 2023, for International Patent Application No. PCT/DE2022/100908. (15 pages) (with English translation of International Search Report).

Office Action, dated Sep. 20, 2022, for German Patent Application No. 10 2021 132 926.4 (10 pages).

* cited by examiner

CONTACT SPRING ASSEMBLY FOR THE SELF-LOCKING CONTACTING OF AN ELECTRICAL CONDUCTOR

BACKGROUND

Technical Field

Embodiments of the present disclosure relate to a contact spring arrangement for the self-locking contacting of a core of an electrical conductor, having a support wall made of a conductive material, a contact spring which has a base leg, held fixed in place with respect to the support wall, and a clamping leg which is connected to the base leg by a curve section and forms, together with the support wall, a plug-in receptacle, tapering in the insertion direction, for the core of the conductor and the clamping leg has at its free end a gripping edge for the core, and having a release element which is guided in a displaceable manner with respect to the support wall in the insertion direction and has an actuating arm which in a release position engages with its free end against a stop that is formed by a curved section of the clamping leg and holds the clamping leg against the spring force in a position that is curved back against the base leg.

Description of the Related Art

An example of a contact spring arrangement of this type is described in the document DE 10 2015 114 938 A1. The support wall can be part of a conductive structure, for example a conductor rail or a plug connector contact. In order to bring the core of the conductor into contact with this structure, a stripped end of the core (for example a copper core) is inserted into the plug-in receptacle. The end of the core slides onto the flank of the clamping leg and deflects this clamping leg. Due to the elastic restoring force of the spring, the gripping edge that is formed at the free end of the clamping leg claws into the copper wire. If an attempt is now made to retract the conductor, the force exerted by the core on the gripping edge tends to swivel the clamping leg further toward the support wall and presses even more firmly on the core, so that the core is held in position in a self-locking manner.

In order to release the contact again, the release element is pushed in the insertion direction so that the actuating arm presses on the stop of the clamping leg and bends the clamping leg back. This releases the core of the conductor so that the conductor can be withdrawn from the plug-in receptacle.

During the priority application regarding the current application, the German Patent and Trademark Office has researched the following prior art:

DE 10 2021 108 600 B3, DE 10 2015 106 073 A1, DE 10 2015 114 938 A1, DE 202 05 821 U1 and DE 20 2016 104 707 U1.

BRIEF SUMMARY

Embodiments of the present disclosure are provided to improve the contact spring arrangement in terms of space requirements, functional reliability and ease of operation.

A clamping leg according to an embodiment of the present disclosure has a bend in a section that adjoins the stop and the bend is curved in the direction which is opposite the curvature direction of the curve section and the bend is followed up to the stop by another bend that is curved in the same direction.

If a curvature in the direction in which the curve section is also curved is referred to as a positive curvature and a curvature in the opposite direction as a negative curvature, the curvature of the clamping leg of the conventional contact spring arrangement can be described as follows: The positively curved curve section is followed by a straight section, which then transitions into the stop in a zone with negative curvature. The stop is then followed by a zone with positive curvature and then another zone with negative curvature, which merges into another straight section that forms the gripping edge at the free end. The triple curvature in alternating directions in the region of the stop ensures that the straight sections which adjoin the stop proximally and distally can run approximately parallel to one another. According to embodiments of the present invention, at least one of these two straight sections now has an additional bend with a positive curvature. This allows the space required for the contact spring arrangement to be minimized and/or the holding force at the gripping edge to be improved. A "bend" is generally understood here to mean a location on the length of the contact spring at which the amount of curvature has a local extremum (minimum or maximum).

In some embodiments, the additional bend may be located in the proximal section which is located between the curve section and the stop, or in the distal section of the clamping leg which is located between the stop and the gripping edge. In the former case, a reduction in the space required is achieved, while in the latter case, above all an increase in the gripping force is achieved, which the clamping spring exerts on the conductive wire with its gripping edge. At least two embodiments may also be combined so that the clamping spring has an additional bend in each of the two straight sections.

In some embodiments, the change in direction of the clamping leg may be at least 20°, or better at least 30°, at each of the two bends that are curved in the same direction.

BRIEF DESCRIPTION OF THE SEVERAL VIEWS OF THE DRAWINGS

Embodiments of the present disclosure are explained below in detail with reference to the drawings.

DETAILED DESCRIPTION

Figure 1:
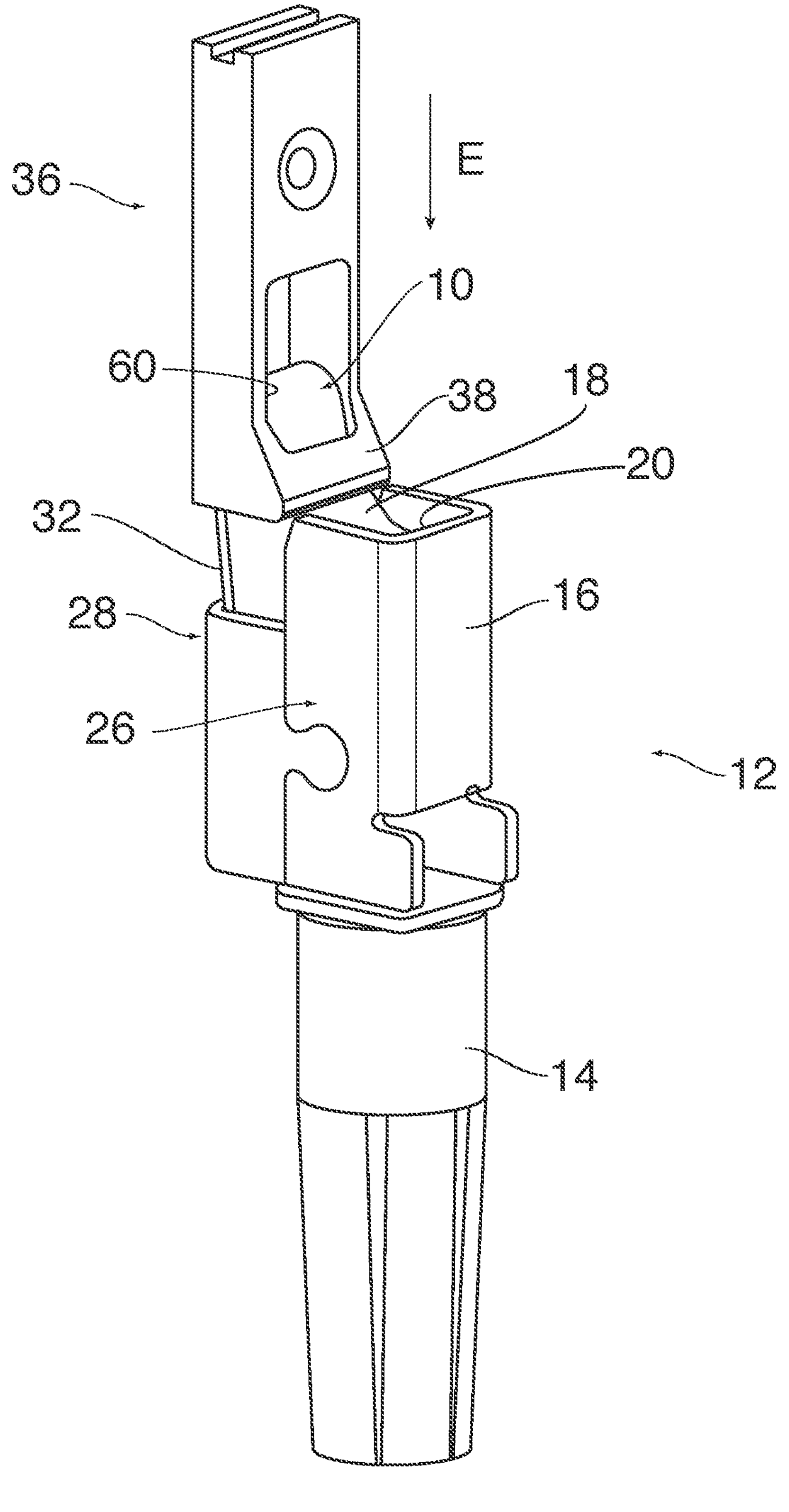
FIG. 1 shows a perspective view of a contact spring arrangement in accordance with a first embodiment of the disclosure.

The contact spring arrangement shown in FIG. 1 has a contact spring 10 made of metal and an electrically conductive structure 12 which forms a socket contact 14 and a support wall 16. As can be seen more clearly in FIGS. 2 and 3, the support wall 16, together with a clamping leg 18 of the contact spring 10, forms a plug-in receptacle 20 for a stripped end of a core 22 of an electrical conductor 24, which is to be brought into electrical contact with the support wall 16.

The support wall 16 is one of three walls of a channel 26, which is electrically and mechanically connected to the socket contact 14 and receives part of the contact spring 10. On the side opposite the support wall 16, the channel 26 is closed off by a holder 28 for a base leg 30 of the contact spring 10. The base leg 30 is extended upward (against an insertion direction E of the electrical conductor 24) by a connecting section 32, which is connected to a proximal section of the clamping leg 18 by a curve section 34, so that the clamping leg 18 extends at an angle to the insertion direction E in the direction of a depth of the plug-in receptacle 20.

A release element 36 is guided so as to be displaceable parallel to the insertion direction E with the aid of a guide device, not shown, and has an actuating arm 38 that slopes at an angle to the clamping leg 18.

Figure 5:
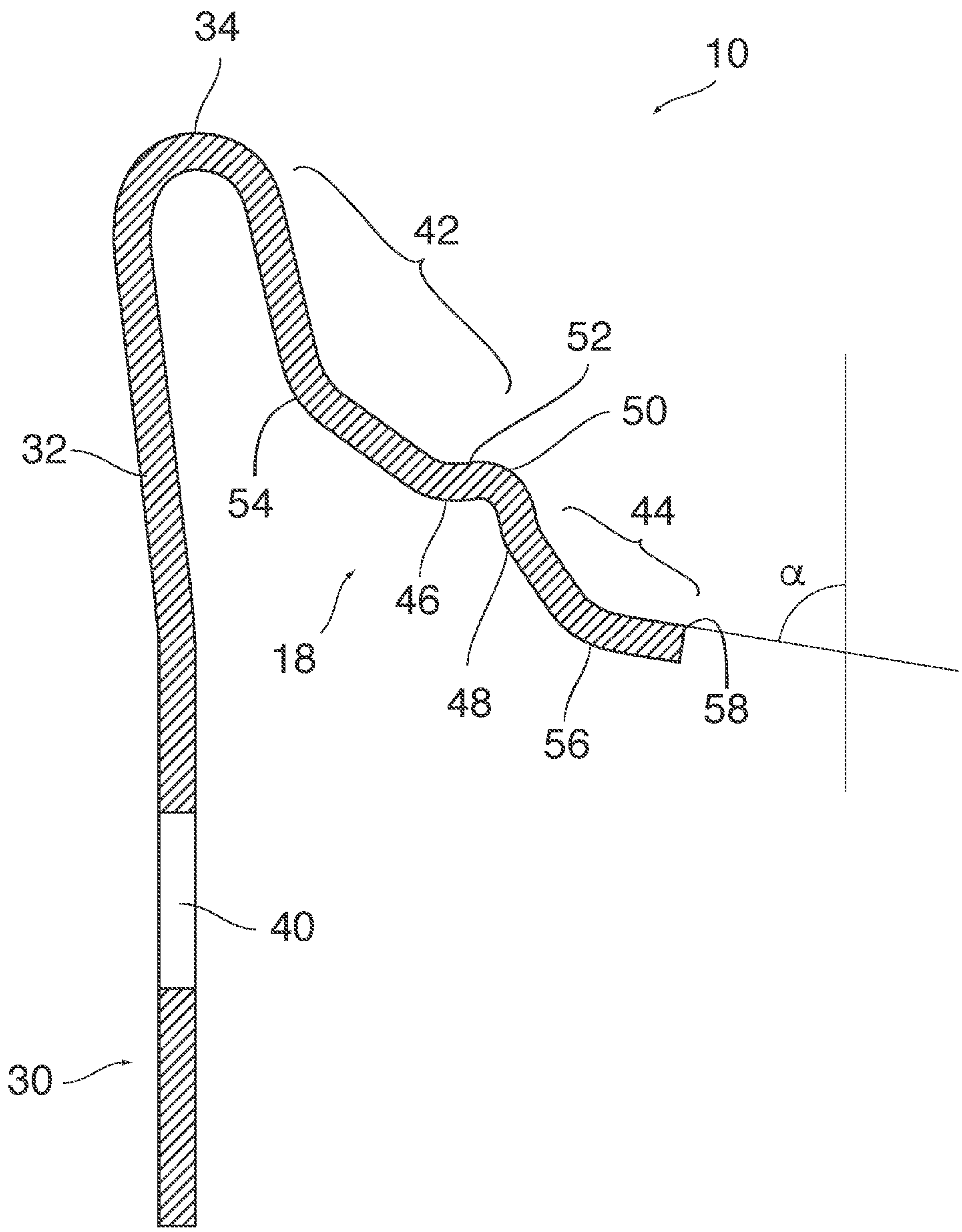
FIG. 5 shows a section through the contact spring of the contact spring arrangement shown in FIGS. 1 to 4.

The contact spring 10 is shown enlarged in FIG. 5. The base leg 30 has a fastening hole 40 in which a pin of the holder 28 engages when the base leg 30 is in contact with this holder 28. In this way, the contact spring 10 is held positively in its position in the channel 26.

The connecting section 32 which is located outside the channel 26 is angled by approximately 6° to 8° in relation to the base leg 30. This allows a horizontal distance between the base leg 30 and the support wall 16 to be reduced for a given radius of the curve section 34.

The clamping leg 18 has a proximal section 42 that adjoins the curve section 32 and a distal section 44, which forms a free end of the clamping leg 18. The clamping leg 18 forms three bends 46, 48, 50 between the proximal and distal sections 42 and 44. The two bends 46, 48, which adjoin the proximal and distal sections 42 and 44, have a negative curvature, i.e., their direction of curvature is opposite to the direction of curvature of the curve section 34. The intermediate bend 50 has a positive curvature. A stop 52 for the actuating arm 38 of the release element 36 is formed between the two bends 46 and 50.

The proximal section 42 has two straight subsections, between which there is a bend 54 with a negative curvature. The distal section 44 is also divided into two straight subsections, between which there is a bend 56 with a negative curvature.

At the free end of the distal section 44, an upper edge of the clamping leg 18 forms a gripping edge 58, which is intended to claw into the copper of the core 22 (FIG. 3) when this core is clamped in the plug-in receptacle 20.

Figure 2:
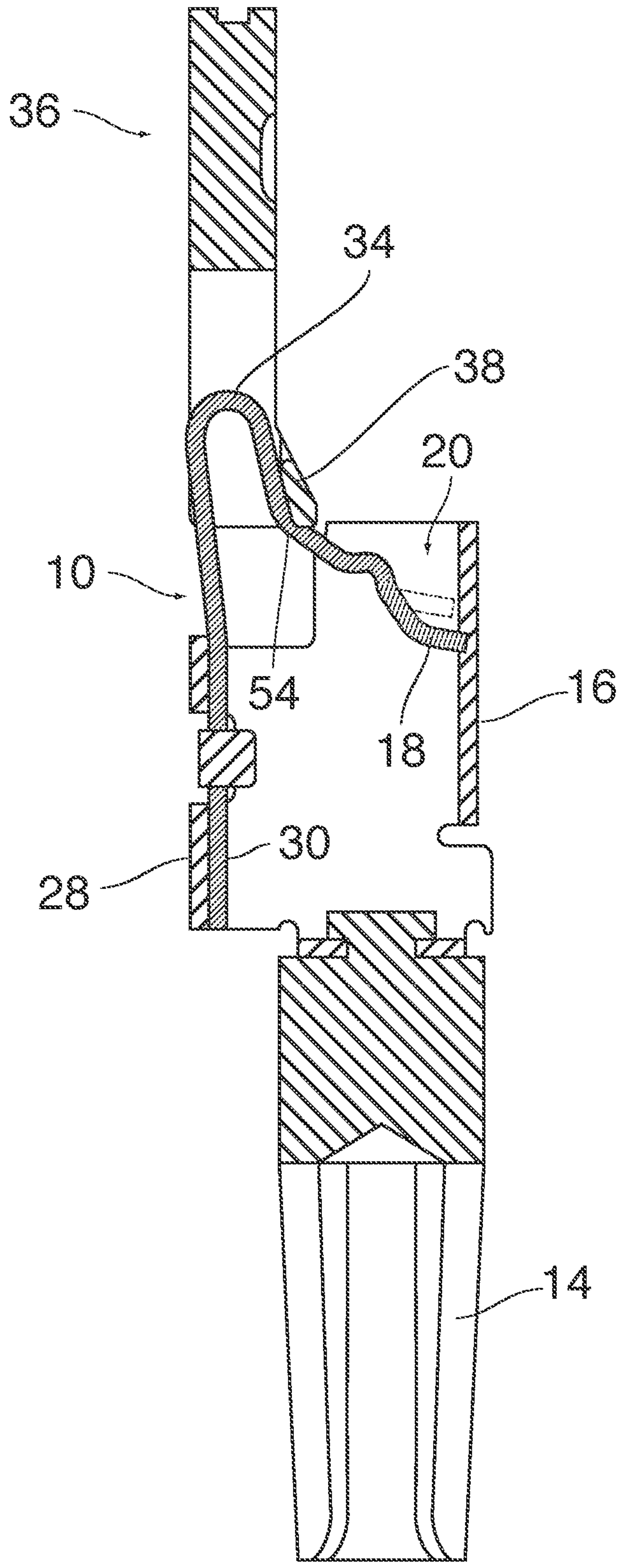
FIG. 2 shows a section through the contact spring arrangement according to FIG. 1 in a non-use state.

FIGS. 5 and 2 show the contact spring 10 in a relaxed, i.e., unloaded state. It is apparent in FIG. 2 that the free end of the clamping leg 18 would protrude slightly into the support wall 16 in the relaxed state. This means that when the contact spring 10 is installed, the clamping leg 18 is bent back slightly so that its gripping edge 58 is in contact with the support wall 16 under slight tension. This slight pretension fixes the contact spring 10 in its installation position.

It is apparent in FIG. 2 also that the cross-section of the actuating arm 38 also overlaps slightly with the cross-section of the clamping leg 18. In the actual installation position, the curve section 34 of the contact spring 10 is therefore also slightly more curved, so that the proximal section of the clamping leg 18 is also in contact with the actuating arm 38 under tension. In FIG. 2, the contact site of the actuating arm 38 with the clamping leg 18 is located in the negatively curved bend 54 of the proximal section. The section of the clamping leg 18 between the curve section 34 and the bend 54 can therefore be very steep, which further reduces the distance between the base leg 30 and the support wall 16.

Figure 3:
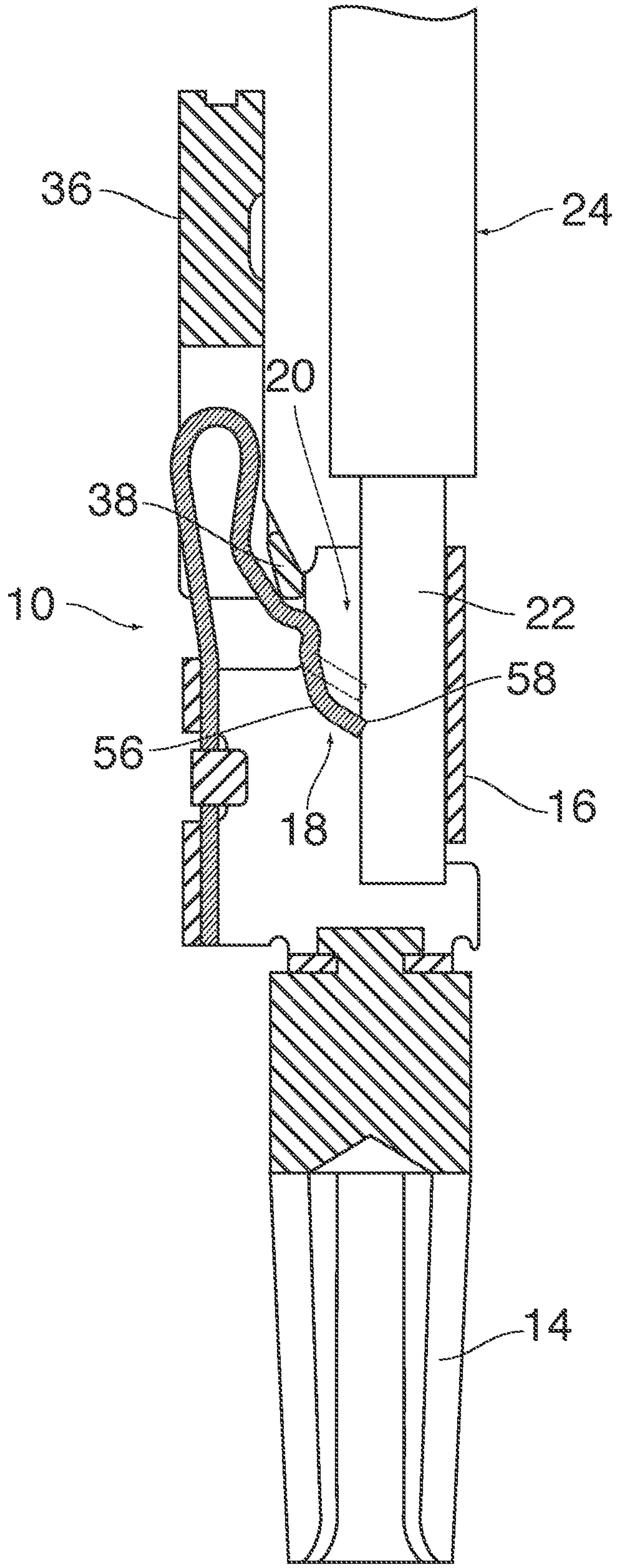
FIG. 3 shows a section through the contact spring arrangement in a state in which a core of an electrical conductor is held clamped in the contact spring arrangement.

FIG. 3 shows the state in which the core 22 is inserted into the plug-in receptacle 20 and the clamping leg 18 claws into the copper of the core 22 with its gripping edge 58. The clamping leg 18 was bent downward overall when the core 22 was inserted, wherein the main deformation occurs in the region of the curve section 34. The actuating arm 38 of the release element was able to move along the clamping leg 18 from the position of the bend 54 to the vicinity of the bend 46. The release element 36 has lowered so far overall that the actuating arm 38 now receives additional guidance from a vertical contour of the walls of the holder 28.

As is apparent in FIG. 1, the release element 36 is pierced by a window 60, which also extends into the actuating arm 38 and whose width is greater than the width of the contact spring 10. If, when the core 22 is inserted, the lower end of this core presses on the clamping leg 18, the torque exerted on the contact spring 10 tends to swivel the connecting section 32 to the right in FIG. 5. If necessary, this deformation can be so strong that the curve section 34 passes through the window 60. The actuating arm 38 can therefore also be arranged very steeply, which further contributes to reducing the horizontal dimensions of the arrangement without hindering the deformation of the contact spring 10 by the release element.

In the state shown in FIG. 3, the straight lower section at a distal end of the clamping leg 18 forms an angle of approximately 45° with a vertical insertion direction E. The gripping edge 58 is limited by an upper surface and an edge surface of the contact spring 10. These two surfaces form a right angle with each other, and the bisector of this angle is approximately perpendicular to the surface of the core 22. Due to this geometry, the gripping edge 58 can dig deep into the copper of the core 22. If the bend 56 (FIG. 5) were not present, the distal section 44 of the clamping leg 18 would be straight overall and it would run in the direction in which the subsection between the bends 48 and 54 runs in FIG. 5. In the state shown in FIG. 3, the part of the clamping leg 18 that forms the gripping edge 58 would then be set so steeply that the gripping edge could penetrate the copper much less easily. The bend 56 thus improves the holding force of the gripping edge 58.

As indicated by the dotted line in FIG. 3, the same effect could in principle also be achieved by bending the distal end of the clamping leg 18 to a greater extent at the bend 48 and shortening the distal section 44 overall. However, this would have the consequence that in the state shown in FIG. 2, the clamping leg 18 would no longer rest against the support wall 16 under tension.

Figure 4:
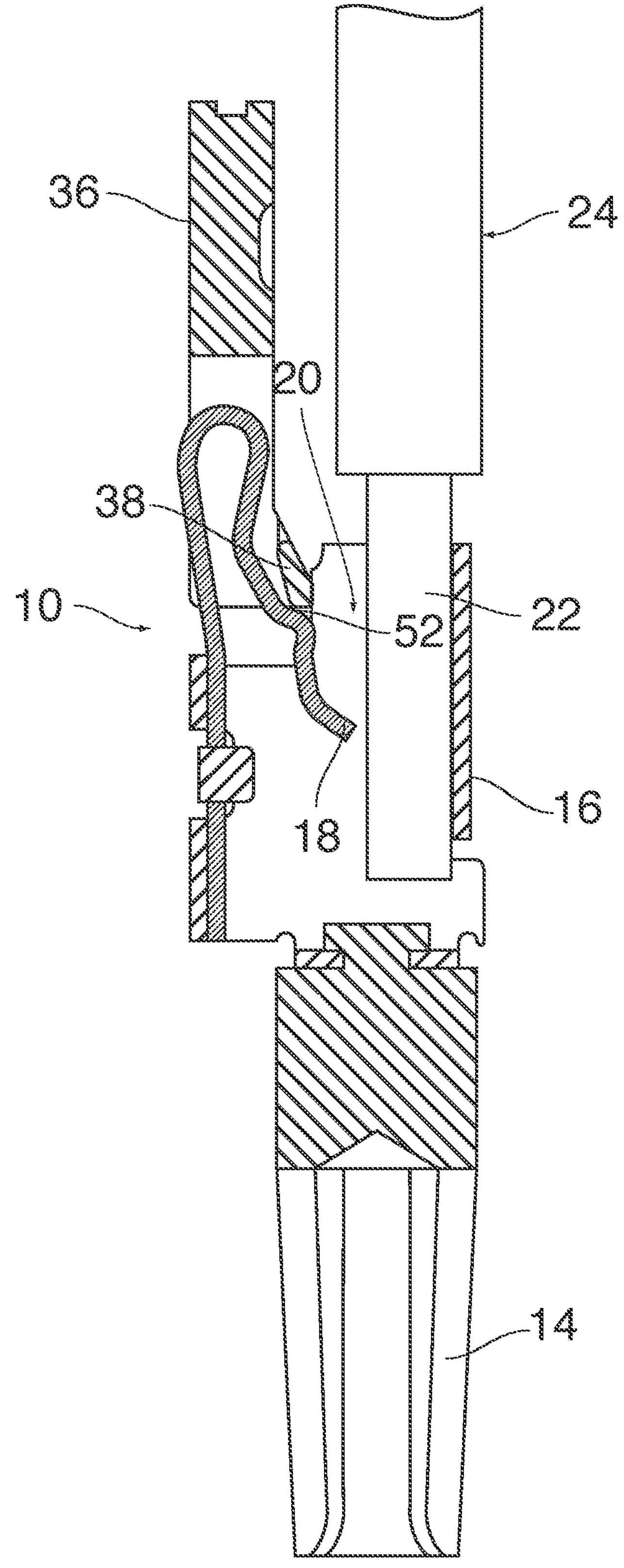
FIG. 4 shows a section through the contact spring arrangement in a release position.

If the core 22 is to be released from the plug-in receptacle 20 in the state shown in FIG. 3, the release element 36 is pressed downward with a screwdriver blade. The actuating arm 38 then runs onto the clamping leg 18 and moves against the stop 52. When the state shown in FIG. 4 is reached, the user feels increased resistance, since the actuating arm 38 is now in contact with the stop 52 and cannot slide any further along the clamping leg 18. In this state, the clamping leg 18 is bent back so far that the gripping edge 58 releases the core 22 and the conductor 24 can be pulled out of the plug-in receptacle. When the release element 36 is then released, the contact spring 10 springs back into its initial position (FIG. 2). The stop 52 exerts an essentially vertical upward force on the actuating arm 38 so that the actuating element can move upward without tilting.

As shown in FIG. 5, the distal end of the clamping leg 18, i.e., the straight section between the bend 56 and gripping edge 58, forms in the relaxed state of the contact spring 10 with the vertical (insertion direction E and at the same time longitudinal direction of the base leg 30) an angle of a between 70° and 90°, such as approximately 80°. The subsection between the bends 48 and 56 forms an angle of 55° to 75° with the vertical, in the example shown approximately 65°. The surface of the stop 52 runs approximately horizontally or slightly upward in the relaxed state according to FIG. 5, and the two subsections of the proximal section 42 form angles of between 65° and 45° or 8° and 15° with the vertical. In the example shown, the angles are approximately 54° and 13°.

The exact geometry of the contact spring 10 can vary depending on the intended use and is dependent on the cross-section or diameter of the core 22 that is to be clamped with the contact spring 10.

Figure 6:
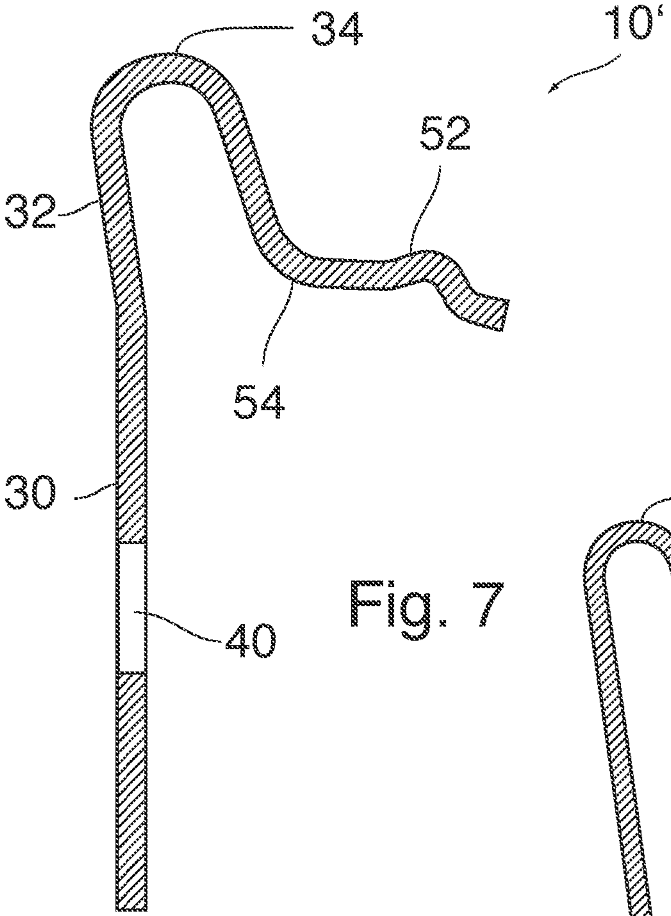
FIGS. 6 and 7 show sections through contact springs in accordance with other embodiments.
Figure 7:
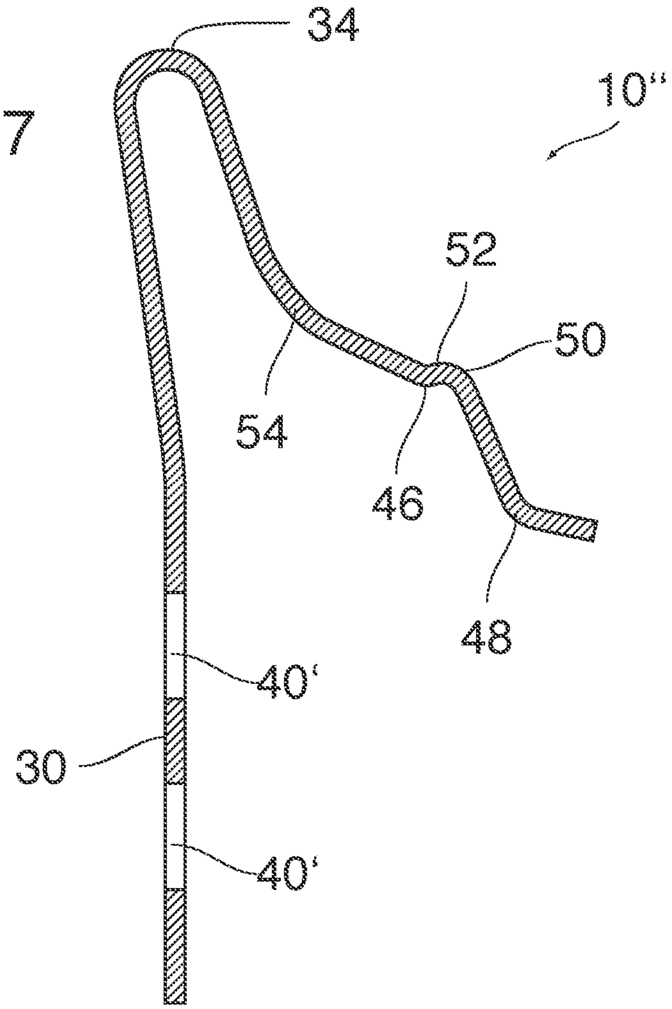

FIGS. 6 and 7 show examples of modified embodiments of the contact spring 10. A contact spring 10' shown in FIG. 6 has only one additional bend 54 in the proximal section between the stop 52 and the curve section 34. The straight section between the bend 54 and the stop 52 runs approximately horizontally when the spring is in the relaxed state. The distal straight section is kept relatively short here and contains no further bend and forms an angle of 75°, for example, with the vertical, while the stop 52 itself has a slightly ascending course here and forms an angle of approximately 100° to 110° with the vertical. The connecting section 32 has a smaller length here in relation to the base leg 30.

FIG. 7 shows a contact spring 10" which is made of a slightly more flexible material and has two fastening holes 40' in the base leg 30. The bend 54 between the curve section 38 and the stop 52 is less sharp here, i.e., it extends over a greater curve length and has a smaller maximum curvature. The stop 52 that is formed between the bends 48 and 50 is shorter here, while there is a longer straight section between the bends 46 and 48.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A contact spring arrangement for the self-locking contacting of a core of an electrical conductor, the contact spring arrangement comprising:

a support wall made of a conductive material;

a contact spring that includes a base leg, wherein the base leg is held fixed in place with respect to the support wall; and a clamping leg connected to the base leg by a curve section and forms, together with the support wall, a plug-in receptacle, tapering in an insertion direction, for the core of the electrical conductor and the clamping leg has at a free end a gripping edge for the core, and having a release element guided in a displaceable manner with respect to the support wall in the insertion direction and has an actuating arm, wherein the actuating arm in a release position engages with its free end against a stop that is formed by a curved section of the clamping leg and holds the clamping leg against a spring force in a position that is curved back against the base leg, wherein the clamping leg has in a section that adjoins the stop a bend which is curved in a direction which is opposite the curvature direction of the curve section and is followed up to the stop by another bend that is curved in the same direction.

2. The contact spring arrangement as claimed in claim 1, wherein the bends are located between the stop and the gripping edge.

3. The contact spring arrangement as claimed in claim 1, wherein the bends that are curved in the same direction are located between the curve section and the stop.

4. The contact spring arrangement as claimed in claim 1, wherein the clamping leg has on both sides of the stop two bends that are curved in the same direction.

5. The contact spring arrangement as claimed in claim 3, wherein the actuating arm extends in the insertion direction at an angle to the support wall and, if a core is not received in the plug-in receptacle, is in contact with the clamping leg in the region of the bend that is formed between the curve section and the stop.

6. The contact spring arrangement as claimed in claim 5, wherein the release element is pierced in a region of the actuating arm by a window whose width is greater than a width of the contact spring.

7. The contact spring arrangement as claimed in claim 1, wherein a straight end section of the clamping leg that adjoins the gripping edge forms with the insertion direction an angle which is between 70° and 90°.

8. The contact spring arrangement as claimed in claim 1, wherein the change in direction of the clamping leg is at least 20° at each of the respective two bends that are curved in the same direction.

9. The contact spring arrangement as claimed in claim 8, wherein the change in direction of the clamp leg is at least 30° at each of the two bends that are curved in the same direction.

10. The contact spring arrangement as claimed in claim 7, wherein the angle formed between the straight end section of the clamping leg and the insertion direction is between 75° and 85°.

* * * * *